(12) United States Patent
Liang

(10) Patent No.: US 7,965,501 B2
(45) Date of Patent: Jun. 21, 2011

(54) MODULAR FIXTURE FOR A DATA STORAGE UNIT INSIDE A COMPUTER

(75) Inventor: Yu-Cheng Liang, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 666 days.

(21) Appl. No.: 12/081,803

(22) Filed: Apr. 22, 2008

(65) Prior Publication Data
US 2009/0180258 A1    Jul. 16, 2009

(30) Foreign Application Priority Data

Jan. 12, 2008 (CN) .......................... 2008 1 0025834

(51) Int. Cl.
H05K 7/00 (2006.01)
H05K 7/10 (2006.01)
H05K 7/12 (2006.01)
(52) U.S. Cl. .................... 361/679.37; 361/759
(58) Field of Classification Search ............. 361/679.33, 361/679.37, 726, 759; 312/223.1, 223.2; 211/26
See application file for complete search history.

(56) References Cited

U.S. PATENT DOCUMENTS

| | | | |
|---|---|---|---|
| 6,418,011 B2 * | 7/2002 | Omori ...................... | 361/679.33 |
| 6,556,434 B1 * | 4/2003 | Chan et al. ............... | 361/679.33 |
| 6,614,654 B2 * | 9/2003 | Liu et al. .................. | 361/679.33 |
| 6,628,515 B2 * | 9/2003 | Chen et al. ............... | 361/679.33 |
| 6,654,238 B2 * | 11/2003 | Chen ........................ | 361/679.58 |
| 6,667,880 B2 * | 12/2003 | Liu et al. .................. | 361/679.35 |
| 6,744,625 B2 * | 6/2004 | Syring et al. ............. | 361/679.33 |
| 6,798,653 B2 * | 9/2004 | Chen et al. ............... | 361/679.33 |
| 6,813,148 B2 * | 11/2004 | Hsu et al. .................. | 361/679.39 |
| 6,980,429 B2 * | 12/2005 | Ericks n et al. .......... | 361/679.32 |
| 7,085,131 B2 * | 8/2006 | Peng et al. ............... | 361/679.32 |
| 7,180,734 B2 * | 2/2007 | Jing .......................... | 361/679.33 |
| 7,190,574 B2 * | 3/2007 | Muenzer et al. ......... | 361/679.32 |
| 7,259,960 B2 * | 8/2007 | Hua et al. ................. | 361/679.33 |
| 7,369,404 B2 * | 5/2008 | Han et al. ................. | 361/679.33 |
| 7,382,610 B2 * | 6/2008 | Lin et al. .................. | 361/679.33 |
| 7,782,605 B2 * | 8/2010 | Wu et al. .................. | 361/679.39 |
| 7,826,209 B2 * | 11/2010 | Chen et al. ............... | 361/679.37 |
| 2006/0061956 A1 * | 3/2006 | Chen et al. ..................... | 361/685 |
| 2006/0209508 A1 * | 9/2006 | Han et al. ...................... | 361/685 |

* cited by examiner

Primary Examiner — Jayprakash N Gandhi
Assistant Examiner — Xanthia Cunningham
(74) Attorney, Agent, or Firm — Rosenberg, Klein & Lee

(57) ABSTRACT

A fixture for fixing a data storage unit is disclosed. The fixture includes: a body receives the computer components and defines a protrusion and a hole thereon; a separating piece includes a separating portion correspondingly to the protrusion; a fixing piece includes a lockpin correspondingly to the hole of the body, and the separating piece is set between the fixing piece and the body; and a controlling component fixes the fixing piece on the body. The fixture of the present invention can rapidly fix or remove a data storage unit inside a computer case without any screws. The assembly cost and the maintaining cost of the fixture are low, and the assembly and the disassembly of which is simple and timesaving.

12 Claims, 4 Drawing Sheets

MODULAR FIXTURE FOR A DATA STORAGE UNIT INSIDE A COMPUTER

BACKGROUND OF THE INVENTION

1. Field of the Invention

The present invention relates to a fixture fixing a data storage unit, and more particular to a modular fixture rapidly fixing a data storage unit inside a computer case without any screws.

2. Description of Related Art

The hardware of a computer generally includes: a main board, various interface cards, data storage units (such as a floppy disk drive, a hard drive, a CD-ROM, and a disk drive, etc.), all of these are call computer components, and the computer components are integrated in a computer case. Because the floppy disk drive, the hard drive, and the CD-ROM can be selectively configured, the housings of the floppy disk drive, the hard drive, and the CD-ROM are usually installed inside the computer case firstly to provide for easy assembly and subsequent expansion, i.e. the installation of a floppy disk drive, hard drives, and a CD-ROM drive.

Presently, the fixing method of the data storage units (such as the disk drive) is that a housing is fixed inside a computer case via screws, then to set the disk drive onto the housing, and the disk drive is fixed onto the housing by the screws, so that the disk drive is fixed inside the computer case. However, the fixing method has some disadvantages, for example, a screwdriver must be used when assembling or disassembling the disk drive. Thus, the procedure is complex and taxing; it is hard to increase the production efficiency.

Based on the aforementioned matter, some data storage unit fixing methods which are easy for assembly are proposed. One of the methods includes: two sliding bars are set on the disk drive housing, and two sliding rails are respectively set on two sides of the disk drive; the disk drive slide onto the disk drive housing. However, when assembling the disk drive, also, a screwdriver must be used to tighten the screws to fix the sliding bars on the computer case, the procedure is complex and time consuming. Another method is to modularize the disk drive and the disk drive housing, then to block the module inside the computer case. However, the disk drive and the disk drive housing are still modularized via the screws used in the prior art, thus, the cost is high, and the assembly and disassembly are inconvenient.

Consequently, because of the technical defects of described above, the applicant keeps on carving unflaggingly through wholehearted experience and research to develop the present invention, which can effectively improve the defects described above.

SUMMARY OF THE INVENTION

The object of the present invention is to provide a fixture, which is low-cost and timesaving when assembling, thus, the data storage unit (or computer component) is rapidly fixed or removed.

For achieving the object described above, the present invention provides a fixture to rapidly fix and remove the data storage unit along a longitudinal direction of the fixture. The fixture includes: a body receives the computer components and defines a protrusion and a hole thereon; a separating piece includes a separating portion correspondingly to the protrusion; a fixing piece is set on the body, and the separating piece is set between the fixing piece and the body, the fixing piece includes a lockpin correspondingly to the hole of the body; and a controlling component connects with the body and the fixing piece, the lockpin passes in and out the hole to fix and remove the computer components.

Preferably, the separating portion includes a pressing portion, the pressing portion protrudes out of the body, and when the pressing portion is pressed, the separating piece moves and the fixing piece departs from the side wall of the body.

Moreover, the fixing piece includes a body and two side walls extending in one direction from the base body, a quadratic hole is defined on one of the side walls near the base body, the pressing portion extends out of the quadratic hole.

Furthermore, the controlling components include a first spring and a second spring, the first spring connects with the body and one side wall of the fixing piece, the second spring connects with the body and another side wall of the fixing piece, when the pressing portion isn't pressed, spring force is provided to move the fixing piece and the separating piece to attach on the body.

Preferably, both the protrusion of the body and the separating portion respectively have some oblique surfaces neither parallel nor perpendicular to the main surfaces of the box. In the assembled state, the two oblique surfaces cooperate with each other. When the pressing portion of the separating piece is pressed downwards, the separating piece slides downwards via the two cooperating oblique surfaces, and moves in a direction away from the body guided by the oblique surfaces. Thus, the fixing piece is pushed to move in a direction of away from the body.

Preferably, the separating piece includes at least a fixing portion, the fixing piece includes at least a guiding hole, the fixing portion moves in the guiding hole.

Preferably, the body defines a locating hole thereon, the fixing piece includes a locating claw, and the locating claw is inserted in the locating hole.

Preferably, the holes of the body are formed on the side wall of the body, and there is a plurality of the holes which are arranged in rows, and the distance between two adjacent rows approximately equals the thickness of the computer component, which is to be fixed.

Preferably, the fixing piece has a plurality of lockpins which are arranged in rows, and the distance between two adjacent rows approximately equals the thickness of the computer component to be fixed.

The fixture of the present invention can rapidly fix or remove a data storage unit inside a computer case without any screws. The assembly and maintaining costs of the fixture are low, and the assembly and the disassembly of which is simple and timesaving.

DETAILED DESCRIPTION OF THE PREFERRED EMBODIMENTS

Figure 1:
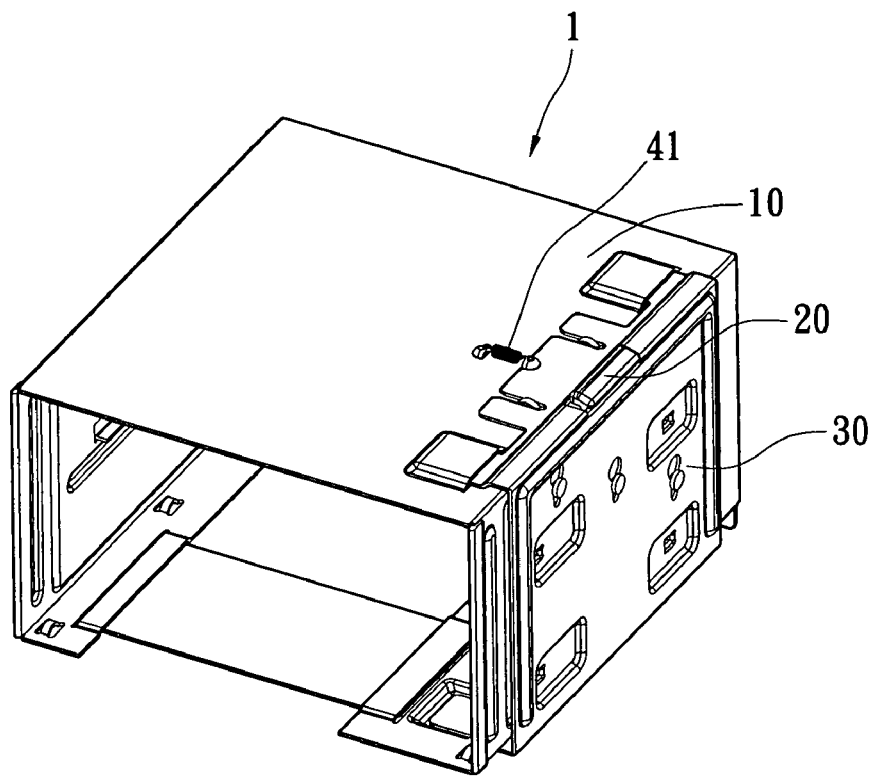
FIG. 1 is a schematic view illustrating a preferred embodiment of a disk drive fixture in an assembling state according to the present invention.
Figure 6:
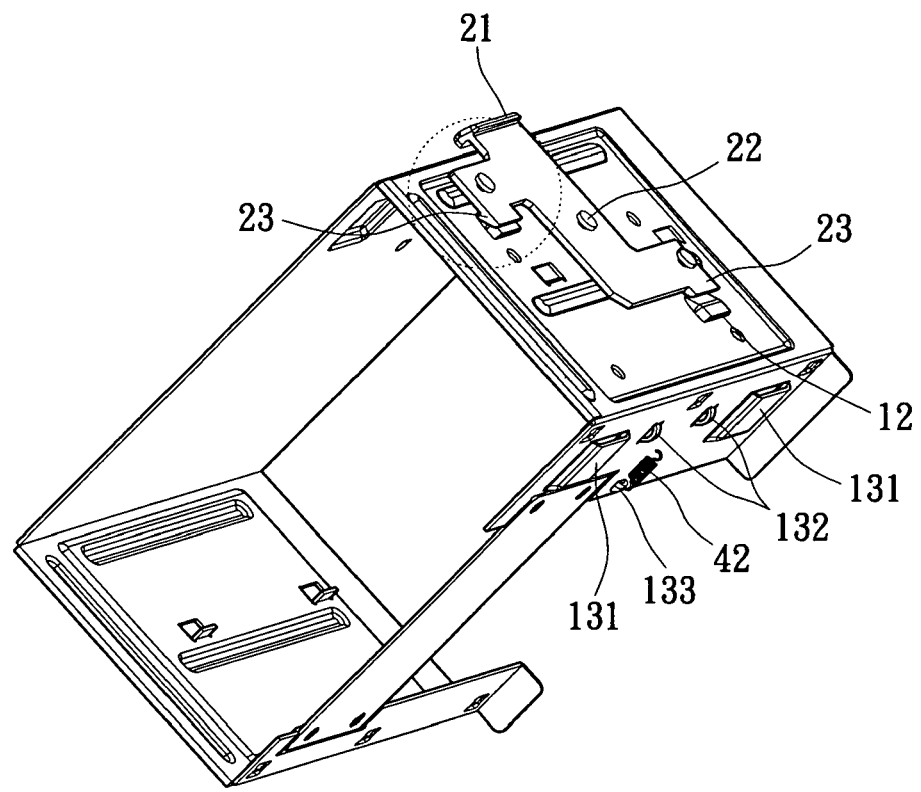
FIG. 6 is a schematic view of the body assembled with the separating piece of FIG. 1.
Figure 7:
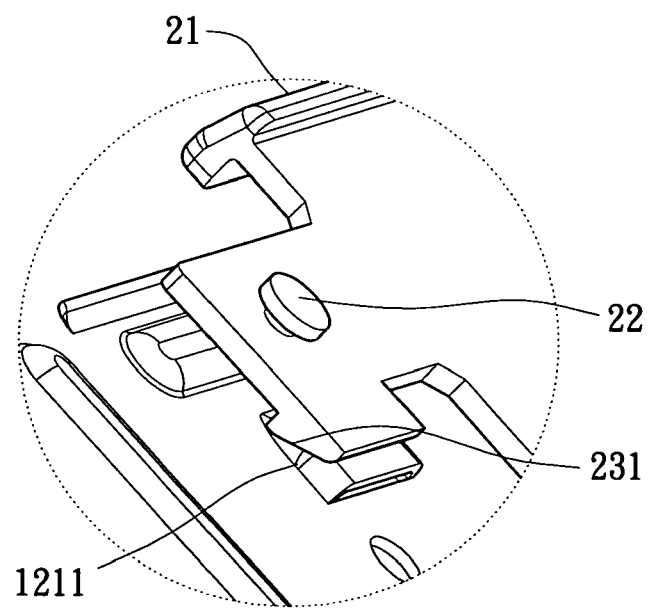
FIG. 7 is a partially enlarged view of FIG. 6.
Figure 8:
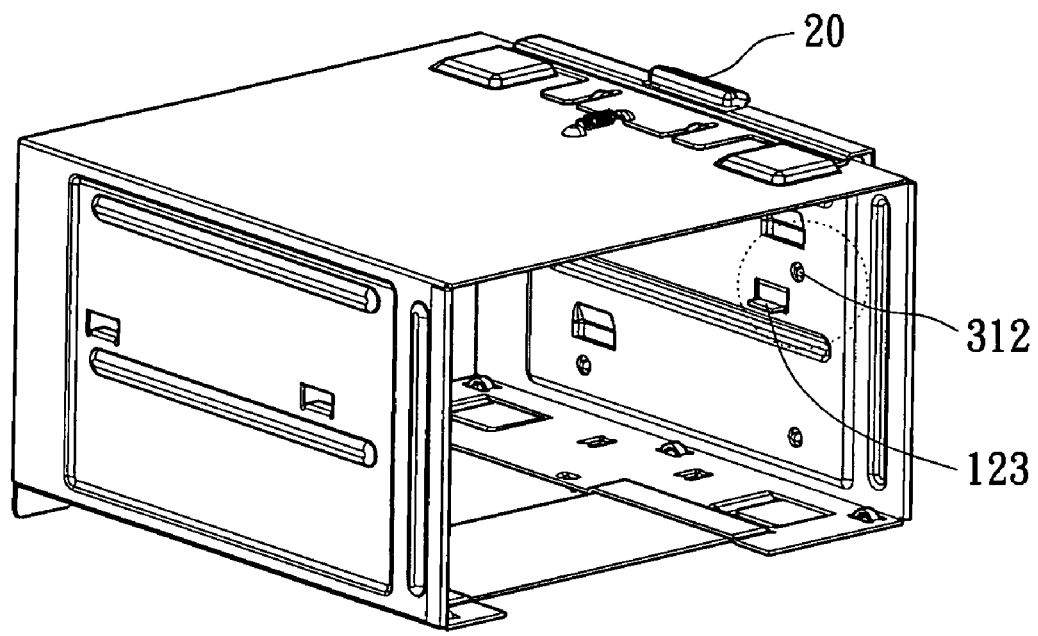
FIG. 8 is a schematic view illustrating the inside of a preferred embodiment of a disk drive fixture in an assembling state according to the present invention.
Figure 9:
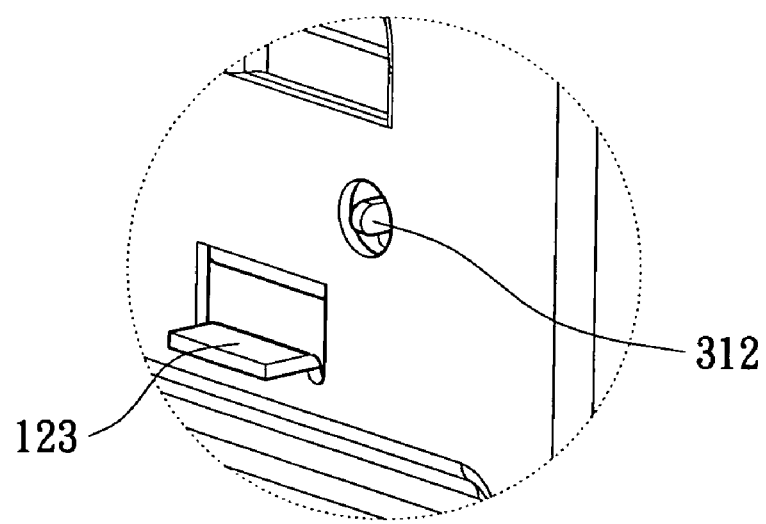
FIG. 9 is a partially enlarged view of FIG. 8.

Please refer to FIG. 1 illustrating a fixture of an embodiment, which is used to rapidly fix or remove a data storage unit. The fixture 1 includes a body 10, a separating piece 20, a fixing piece 30 and controlling components. The controlling components properly fix the fixing piece 30 on the body 10. In the present invention, the controlling components are springs and include a first spring 41 and a second spring 42 (the second spring 42 is not shown in FIG. 1 because of the angle of view, please refer FIG. 6), wherein, the separating piece 20 is set between the body 10 and the fixing piece 30.

Figure 2:
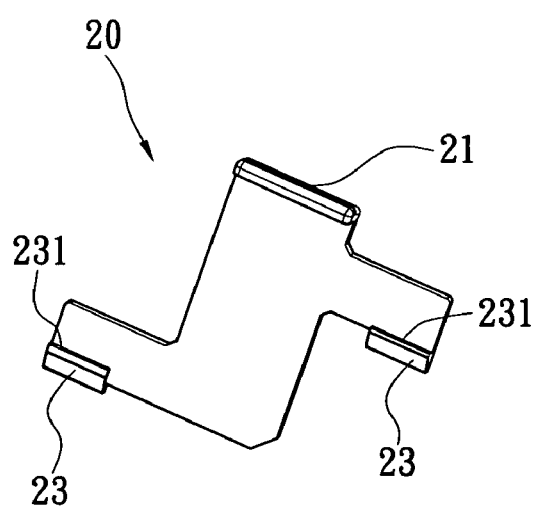
FIG. 2 and FIG. 3 are schematic views illustrating the disassembling component of FIG. 1.
Figure 3:
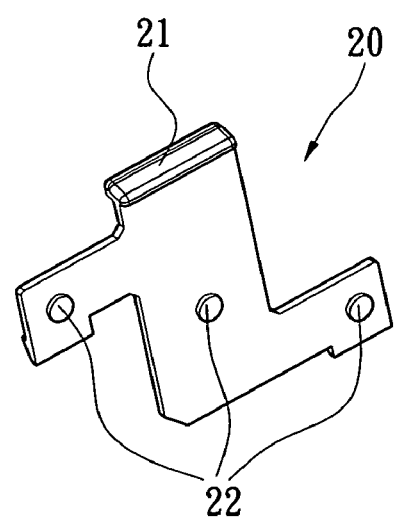

Please refer to FIG. 2 and FIG. 3, the separating piece 20 includes a pressing portion 21, at least one fixing portion 22 and at least one separating portion 23. In this embodiment the fixing portions 22 consist of three cylindrical protrusions formed on a wall of the separating piece 20. The separating portions 23 consist of two structures extending from a wall of the separating piece 20, the structures have a hook shape.

Figure 4:
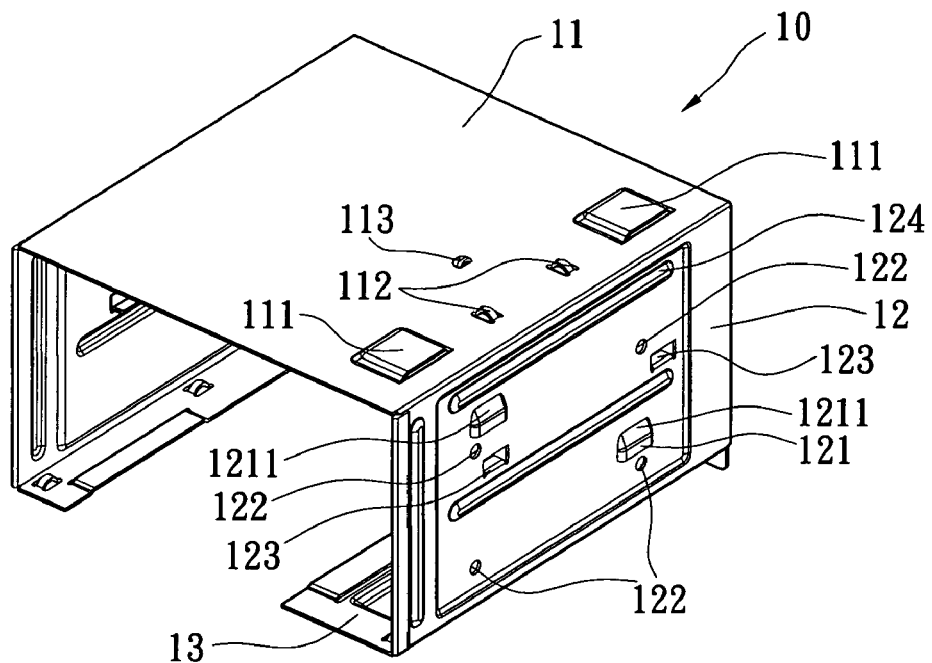
FIG. 4 is a schematic view illustrating the body of FIG. 1.

Please refer to FIG. 4, the body 10 includes an inner space, which may receive a data storage unit (a disk drive in the present embodiment) in two-dimensional at least. The body 10 includes a first side wall 11, a second side wall 12 and a third side wall 13, the second side wall 12 adjoins between the first side wall 11 and third side wall 13.

Fixing members are formed on the first side wall 11 to assemble the fixture 30 and the first spring 41, in more detail, to assemble a pair of locating holes 111, a pair of locating protrusions 112 of the fixture 30, and a hole 113 of the spring 41.

Fixing members are formed on the third side wall 13 to assemble the fixture 30 and the second spring 42, in more detail, to assemble a pair of locating holes 131, a pair of locating protrusions 132 of the fixture 30, and a hole 133 of the spring 42.

At least a separating protrusion 121 and at least a lockpin hole 122 are formed on the second side wall 12. The separating protrusion 121 defines an oblique surface 1211 thereof. In the present embodiment, there are two separating protrusions 121, which are set on different horizontal lines and not collinear in vertical direction. There may be a plurality of separating protrusions 121. Preferably, the separating protrusions 121 are distributed along a diagonal line of the second side wall 12. In the present embodiment, there are four circular lockpin holes 122, wherein, every two lockpin holes 122 are collinear, and the collinear two lockpin holes 122 are on one level. Further, there may have three or more lockpin holes 122 arranged in rows, and there are several rows of lockpin holes 122, the distance between two adjacent rows of the lockpin holes 122 approximately equals the height (thickness) of a general disk drive.

At least a disk region septum 123 is set on the second side wall 12. When fixture 1 receives two or more disk drives, two adjacent disk drives are parted by the disk region septum 123, and the disk drives can be located in a direction of stacking the plurality of disk drives. The disk region septum 123 is formed by punching, so that a quadratic hole is formed on the second side wall 12, and a side of the portion of the second side wall 12 corresponding to the quadratic hole connects with the second side wall 12, and the other portion thereof flatly bents into the inner of the body 10 to form the disk region septum 123.

At least a disk drive limiting slot 124 is set on the second side wall 12. In the present embodiment, there are two limiting slots 124 and both are formed by punching. The periphery of the limiting slots 124 protrude outwards from the second side wall 12 somewhat.

Figure 5:
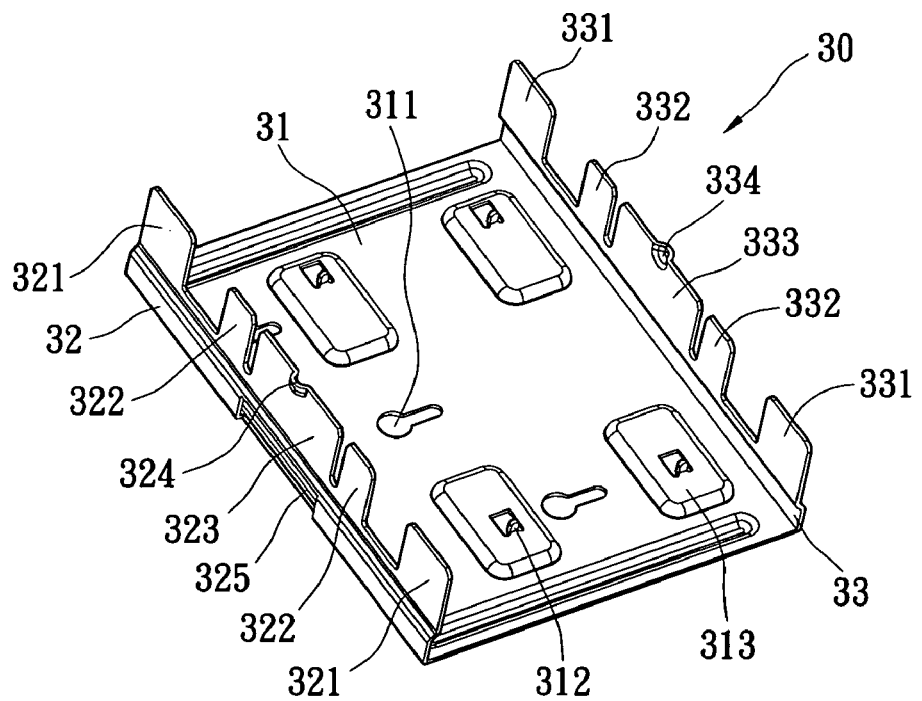
FIG. 5 is a schematic view illustrating the fixture of FIG. 1.

Please refer to FIG. 5, the fixing piece 30 is sheet metal and includes a base body 31 and two walls 32, 33. The walls 32, 33 extend from the two ends of the base body 31 in a vertical direction relative to the base body 31. A first locating claw 321, a second locating claw 322 and a third locating claw 323 are respectively formed on the wall 32, wherein, the first locating claw 321 may be inserted into the locating hole 111 of the body 10, the second locating claw 322 may be inserted between the locating hole 111 and the locating protrusion 112, and the third locating claw 323 may be inserted between the pair of the locating protrusions 112. A small hole 324 is defined on the top of the third locating claw 323 to clasp with the first spring 41. In the same way, a first locating claw 331, a second locating claw 332 and a third locating claw 333 are respectively formed on the wall 33, wherein, the first locating claw 321 may be inserted into the locating hole 131 of the body 10, the second locating claw 332 may be inserted between the locating hole 131 and the locating protrusion 132, and the third locating claw 333 may be inserted between the pair of the locating protrusions 132. A small hole 334 is defined on the top of the third locating claw 333 to clasp with the second spring 42.

At least a guiding hole 311 and at least a lockpin 312 are respectively defined on the base body 31. In the present embodiment, there are three guiding holes 311 and each includes a circular opening and a guiding slot communicating with the circular opening, the guiding holes 311 are set along a diagonal line of the base body 31 and neither on a horizontal line nor on a vertical line. There are four lockpins 312 and every two of them are arranged in a manner in one row, and the lockpins 312 set in one row are on one level. The lockpins 312 may be formed by punching, for example, in the present embodiment, a indented area 313 are punched around the lockpin 312, and a small hole is defined in the center of the indented area 313 thereon, a portion of the base body 31 corresponding to the small hole connects with the base body 31 and extends in a direction same as the fixtures such as the first locating claw 321 to form the lockpin 312. Optionally, there may have three or more lockpins 312 arranged in a manner in one row, and a plurality of rows of lockpins 312 may be set thereof. The distance between every adjacent row of said lockpins 312 is about a general height (thickness) of a disk drive.

Furthermore, a quadratic hole 325 is defined on the wall 32 of the fixing piece 30 near to the base body 31 to receive the pressing portion 21 of the separating piece 20.

Please refer to FIG. 6-9 illustrating the assembly state of the present invention respectively. The separating piece 20 attaches on the second side wall 12 of the body 10. The disassembling portion 23 of the separating piece 20 cooperates with the separating protrusion 121 of the second side wall 12, that is, the oblique surface 231 of the separating portion 23 buckles with the oblique surface 1211 of the separating protrusion 121; the first locating claws 321 of the wall 32 of the fixing piece 30 are respectively inserted into the locating holes 111, the second locating claws 322 are respectively inserted between the locating holes 111 and the locating protrusions 112, and the third locating claw 323 is inserted between the pair of the locating protrusions 112. An end of the first spring 41 clasps in the small hole 324 defined on the top of the third locating claw 323, another end clasps in the hole 113 defined on the first side wall 11 of the body 10, here, the first spring 41 is in a natural state. In the same way, the first locating claws 331 of the wall 33 of the fixing piece 30 are respectively inserted into the locating holes 131, the second locating claws 332 are respectively inserted between the locating holes 131 and the locating protrusions 132, and the third locating claw 333 is inserted between the pair of the locating protrusions 132. An end of the second spring 42 clasps in the small hole 334 defined on the top of the third locating claw 333, another end clasps in the hole 133 defined on the second side wall 13 of the body 10, here, the second spring 42 is in a natural state. The plurality of lockpins 312 of the fixing piece 30 are respectively inserted into the corresponding plurality of lockpin holes 122 of the body 10, and the lockpins 312 may go through the lockpin holes 122 to withstand the disk drive in the body 10, thus, the disk drive is fixed therein. The pressing portion 21 of the separating piece 20 goes through the quadratic hole 325 of the fixing piece 30 to protrude out of the body 10. The fixing portion 22 of the separating piece 20 is inserted into the guiding holes 311 of the fixing piece 30. The fixing portion 22 may move downwards or in a direction of away from the second side wall 12 in the guiding holes 311.

When the pressing portion 21 of the separating piece 20 is pressed downwards, the separating piece 20 slides downwards via the two cooperating oblique surfaces of the disassembling portion 23 and the separating protrusion 121 and moves in a direction of away from the second side wall 12 via the guiding of the oblique surfaces. Thus, the fixing piece 30 is pushed to move in a direction of away from the second side wall 12 (here, the first spring 41 and the second spring 42 are in stretch states). Consequently, the lockpins 312 of the fixing piece 30 withdraws the lockpin holes 122 and withstands the disk drive in the body 10 no longer, or leaves a space to adequately receive the disk drive. Thus, the disk drive is easily disassembled in the fixture 1.

When the pressing portion 21 is released, because of the restoring force, the first spring 41 and the second spring 42 pull the fixing piece 30 back to the position of attaching the second side wall 12, the fixing piece 30 pushes the separating piece 20 upwards via the two cooperating oblique surfaces of the disassembling portion 23 and the separating protrusion 121. Thus, the fixture piece, the separating piece, and the body all recover to the primary state.

Moreover, a buckle structure may be set on the body 10, and the fixture 1 may buckle with a corresponding buckle set in the computer case via the buckle structure of the body 10, or, the fixture 1 may be fixed and connected with the computer case via other methods.

The fixture 1 of the present invention can rapidly fix or remove a data storage unit inside a computer case without any screws. The structure of the fixture 1 is simple, the cost of which is low, and the assembly of which is timesaving.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fixture for fixing computer components, the fixture having a longitudinal direction in which the computer component is inserted, the fixture comprising:
   a body, receiving the computer components and defining a protrusion and a hole thereon;
   a separating piece, comprising a separating portion corresponding to said protrusion;
   a fixing piece, set on said body, and said separating piece set between said fixing piece and said body, said fixing piece comprising a lockpin corresponding to said hole of said body; and
   a controlling component, connecting said body and said fixing piece, said lockpin passing in and out of said hole to fix and remove said computer components.

2. The fixture according to claim 1, wherein said separating portion comprises a pressing portion, said pressing portion protrudes out of said body, and when said pressing portion is pressed, the separating piece moves and said fixing piece departs from the side wall of said body.

3. The fixture according to claim 2, wherein the fixing piece comprises a base body and two side walls extending in one direction from said base body, a quadratic hole is defined on one of said side walls near said base body, said pressing portion extending out of said quadratic hole.

4. The fixture according to claim 3, wherein said controlling components comprise a first spring and a second spring, said first spring connects to said body and one side wall of said fixing piece, said second spring connects to said body and another side wall of said fixing piece, and when said pressing portion is not pressed, the spring's force is provided to move said fixing piece and said separating piece to attach on said body.

5. The fixture according to claim 1, wherein said protrusion has an oblique surface, and said pressing portion has an oblique surface corresponding to said oblique surface of said protrusion.

6. The fixture according to claim 1, wherein the said separating piece comprises at least a fixing portion, said fixing piece comprises at least a guiding hole, and said fixing portion moves in said guiding hole.

7. The fixture according to claim 1, wherein said body has a locating hole, and said fixing piece comprises a locating claw, said locating claw being inserted in said locating hole.

8. The fixture according to claim 1, wherein said controlling component is a spring.

9. The fixture according to claim 1, wherein said holes of said body are in the side wall of said body, arranged in rows along the longitudinal direction of said fixture, and the distance between two adjacent rows approximately equals the thickness of the computer component to be fixed.

10. The fixture according to claim 1, wherein said fixing piece comprises a plurality of rows of lockpins, arranged along the longitudinal direction of said fixture, and the distance between two adjacent rows approximately equals the thickness of the computer component to be fixed.

11. The fixture according to claim 1, wherein said computer component is a data storage unit.

12. The fixture according to claim 11, wherein said data storage unit is a hard drive, a floppy disk drive, a disk drive, or a CD-ROM drive.

* * * * *